United States Patent [19]

Warych

[11] Patent Number: 4,874,095
[45] Date of Patent: Oct. 17, 1989

[54] EDGE PROTECTOR AND METHOD OF MAKING SAME

[75] Inventor: Hans Warych, Gelsenkirchen, Fed. Rep. of Germany

[73] Assignee: Signode System GmbH, Dinslaken, Fed. Rep. of Germany

[21] Appl. No.: 202,725

[22] Filed: Jun. 3, 1988

[30] Foreign Application Priority Data

Jun. 3, 1987 [DE] Fed. Rep. of Germany ....... 3718545

[51] Int. Cl.$^4$ .......................... B65D 57/00; B32B 5/16
[52] U.S. Cl. .................................. 206/586; 264/177.1; 264/DIG. 69; 428/2
[58] Field of Search ............... 206/586; 264/37, 177.1, 264/DIG. 69; 428/2, 81, 174, 192, 326

[56] References Cited

U.S. PATENT DOCUMENTS

| | | | |
|---|---|---|---|
| 3,718,536 | 2/1973 | Downs et al. | 428/2 |
| 3,940,466 | 2/1976 | Evers et al. | 264/DIG. 69 |
| 4,013,616 | 3/1977 | Wallace | 428/2 |
| 4,045,603 | 8/1977 | Smith | 428/2 |
| 4,097,648 | 6/1978 | Pringle | 428/2 |
| 4,112,038 | 9/1978 | Garner | 264/DIG. 69 |
| 4,145,389 | 3/1979 | Smith | 264/37 |
| 4,225,640 | 9/1980 | Erb | 428/326 |
| 4,382,108 | 5/1983 | Caroll et al. | 428/2 |
| 4,402,889 | 9/1983 | Bonis | 264/37 |
| 4,624,880 | 11/1986 | Goulding et al. | 428/326 |

Primary Examiner—Jimmy G. Foster
Attorney, Agent, or Firm—Herbert Dubno

[57] ABSTRACT

Edge protectors for strapped stacks are formed by extruding a mass of paper cuttings and molten thermoplastic which preferably derives from coating materials of paper scrap, for example, trimming wastes of food and beverage containers.

6 Claims, 2 Drawing Sheets

EDGE PROTECTOR AND METHOD OF MAKING SAME

FIELD OF THE INVENTION

My present invention relates to an edge protector and to a package in which the edge protector is used to protect a stack of articles around which a strap is placed. The invention also relates to a method of making the edge protector.

BACKGROUND OF THE INVENTION

It is known to provide an edge protector of a stack of articles, e.g. packages or packets which are stacked on a pallet or are otherwise intended to be handled together, the stack being encircled by a strap which is tensioned against the stack in any of a number of ways utilizing, for example, strapping machines or the like. The straps may be made of metal, a fibrous material or a synthetic resin material and the edge protector usually has an angle or L-section profile.

The purpose of the edge protector, of course, is to prevent the strap from biting into the articles of the stack when the strap is tensioned or if the stack is handled.

It is known to provide such an edge protector from a number of layers of paper which are bonded together by an adhesive such as waterglass, the layers being laminated together with the waterglass and the L-shaped or angle profile being imparted before the laminate sets. The wall thicknesses of the two flanges forming the L or the angle can be between 2 and 10 mm and the lengths of these flanges, i.e. the extent to which the flanges project over the sides of the stack can amount to 20 cm or more and will depend on the specific requirements.

While such prior art edge protectors have been found to be suitable for a variety of applications and do indeed prevent damage to the articles of the stack by the straps, they have not been found to be satisfactory when the stack must be stored in the open and the edge protectors are subject to attack by moisture. In practice, the edge protectors pick up the moisture, swell and after a greater or lesser time deteriorate. This of course causes the edge protector to lose its stability and may result in a loosening of the straps which is detrimental to the handling of the stack or package and may even result in a damage to the articles by the loosened straps.

OBJECTS OF THE INVENTION

It is the principal object of the present invention to provide an improved edge protector which satisfies all of the requirements and especially can permit storage of the stack in the open without detrimentally picking up moisture and altering its characteristics with time and resulting in a change in the tension of the straps.

Another object of the invention is to provide an improved package including advanced edge protectors which can be stored in the open without deterioration from moisture pickup.

Still another object of the invention is to provide an improved method of making an edge protector for the purposes described.

I have found that it is possible to fabricate an improved edge protector from pieces, hereinafter referred to as cuttings, of paper and thermoplastic synthetic resin scrap, especially trimming scrap of thermoplastic synthetic resin coated packing paper by subjecting the cuttings to heat and pressure, thereby melting the thermoplastic synthetic resin and allowing the resulting mass to be shipped to the profile of the edge protector.

The term "packing paper" as used herein can refer to papers of different weights per unit area and especially to materials in the range of paperboard or cardboard.

Surprisingly, cuttings of such packing papers and like protectors can be fabricated into edge protectors which, unlike the edge protectors made from paper heretofore, are not prone to moisture pickup since the synthetic resin bonding the paper pieces in the edge protector appear to completely cover the paper or to at least form a protective layer around the paper, permitting storage of the edge protectors in the open without the drawbacks hitherto encountered. The mass is preferably extruded to form the edge protector shape and it is possible to coextrude with this mass additional thermoplastic synthetic resin to insure that there will be substantially complete envelopment of the paper cuttings in the synthetic resin.

The preferred thermoplastic synthetic resin is low molecular weight plastic, especially polyethylene, which bonds effectively to the surfaces of the paper cuttings in the extruded material.

According to another aspect of the invention, the method of applying the heat and pressure for shipping the edge protector to the desired profile can be generated in a variety of ways but preferably involves the mastication of the mass in a plastifying worm-type extrusion press.

According to the invention, therefore, edge protectors of especially high quality can be obtained by comminuting the scrap of paper and thermoplastic synthetic resin to small pieces which are then introduced into the worm-type extrusion press which is operated to generate the heat required to melt the synthetic resin.

The mixture of synthetic resin and the paper cuttings are extruded continuously through an extrusion die into the shape of the edge profile and the individual edge profiles are then cut transversely from the continuous strand with the desired lengths.

Preferably the scrap, especially trimming scrap has a ratio of the weight per unit area of the paper (numerator) and the weight per unit area of the thermoplastic (denominator) between 1.0 and 6.5 and preferably of about 2.

I have found that with this ratio the processing of the cuttings in the worm extrusion press is possible without difficulty, since the synthetic resin content is not only sufficient for this processing but also gives rise to products which satisfy all of the requirements for edge protectors.

This is especially the case when trimming wastes are used and the weight per unit area of the paper is about 200 g/m$^2$ and the weight per unit area of the coating synthetic resin is about 80 g/m$^2$. While a variety of synthetic resins can be used, polyethylene is preferred, polyethylene being especially widely used for beverage and food packaging.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
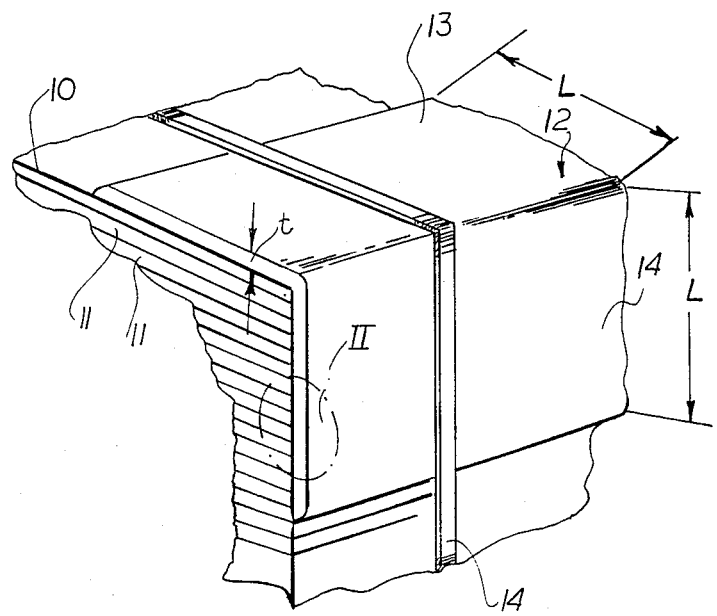
FIG. 1 is a perspective view of a portion of a package in accordance with the present invention.

As can be seen from FIG. 1, a package can be formed from a stack of goods 10 here shown to be individual articles 11 such as papers, signatures, books, small packets or the like which can be stacked on a pallet.

The edge protector 12 which is applied to an edge of this stack has flanges 13 and 14 of lengths L and thicknesses t. The profile is L-shaped, i.e. the edge protectors have angle profiles.

A strap 14 encircles the stack and is braced against the edge protector. The strap may be composed of metal or a synthetic resin, e.g. nylon.

Figure 2:
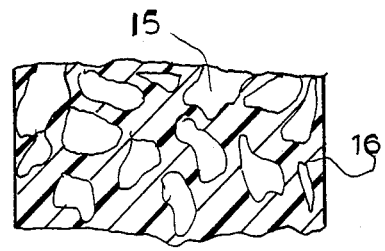
FIG. 2 is a cross section of the region II thereof.

As can be seen from FIG. 2, the hardened mass from which the edge protector is constituted after extrusion consists of the paper cuttings 15 surrounded by the thermoplastic synthetic resin 16 derived from the scrap from which that mass is formed.

Figure 3:
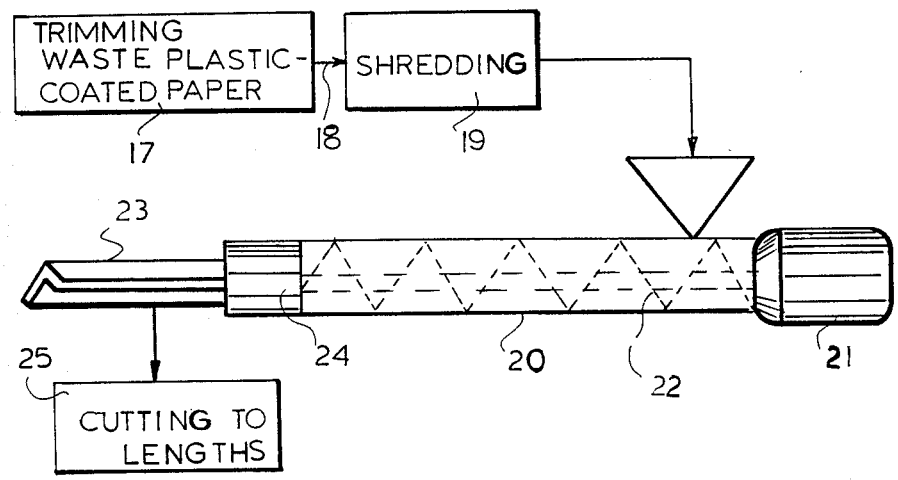
FIG. 3 is a diagram of the method of the invention.

Referring now to FIG. 3 and to a specific example, it will be seen that the initial stage 17 in the processes includes the collection of trimming waste of plastic coated packing paper, especially trimming waste of food cartons in which a paper board is coated with polyethylene, the paper board having a weight per unit area of 200 g/m² and the polyethylene coated a weight per unit area of 80 g/m².

The paper waste is fed at 18 to a shredder 19 in which it is cut up into cuttings having an edge length of 2 to 5 mm. Larger pieces can also be used, however.

The pieces of paper board with our plastic coatings is fed to a worm-type extruder in which they are plastified under pressure and heat until the synthetic resin coating melts and the synthetic resin is so distributed that it completely coats the pieces and forms a plastic envelope for the extrusion. The extruder is represented at 20, is driven by a motor 21 and has a worm 22. The L-shaped strand 23 emerges from the die 24 and after hardening is cut into lengths at 25. The edge protector has a wall thickness of about 5 mm and flange lengths L of about 20 cm.

The edge protector can be used to form packages as described and satisfies all requirements, being insensitive to moisture.

I claim:

1. An edge protector for a stack of articles consisting essentially of a formed mass molded under heat and pressure of paper-waste cuttings and thermoplastic synthetic resin binder, said edge protector having an angular cross section and being composed of packing paper coated on at least one side with the thermoplastic synthetic resin of said binder.

2. A package comprising a stack of articles, a moisture-resistant edge protector of L-shaped cross section fitted over at least one edge of said stack and consisting essentially of a formed mass molded under heat and pressure of paper-waste cuttings and thermoplastic synthetic resin binder, and at least one strap surrounding said stack and braced against said edge protector.

3. The package defined in claim 2 wherein said edge protector is a continuous extrusion, subdivided into lengths, of a mass of cuttings of packing paper coated on at least one side with the thermoplastic synthetic resin of said binder and plastified in a worm plastifier to cause melting of the thermoplastic synthetic resin.

4. A method of making an edge protector for a stack of articles, comprising the steps of:
 (a) forming cuttings of paper and thermoplastic synthetic resin scrap by trimming waste of packing paper coated on at least one side with a thermoplastic synthetic resin, the weight per unit area of the paper being in a ratio to the weight per unit area of said thermoplastic synthetic resin of 1.0 to 6.5;
 (b) feeding said cuttings to a worm extrusion press and operating said worm extrusion press to form a plastified mass of the paper in a melt of said thermoplastic synthetic resin;
 (c) extruding said mass through an extrusion die to form a continuous strand having an angular cross section of an edge protector; and
 (d) cutting lengths from said strand to form said edge protector.

5. The method defined in claim 4 wherein said ratio is about 2.

6. The method defined in claim 4 wherein weight per unit area of the paper is about 200 g/m² and the weight per unit area of said thermoplastic synthetic resin is about 80 g/m².

* * * * *